United States Patent
Park

(10) Patent No.: US 10,681,371 B2
(45) Date of Patent: Jun. 9, 2020

(54) METHOD AND DEVICE FOR PERFORMING DEBLOCKING FILTERING

(71) Applicant: LG Electronics Inc., Seoul (KR)

(72) Inventor: Seungwook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 40 days.

(21) Appl. No.: 15/580,605

(22) PCT Filed: Jun. 7, 2016

(86) PCT No.: PCT/KR2016/005991
§ 371 (c)(1),
(2) Date: Dec. 7, 2017

(87) PCT Pub. No.: WO2016/200115
PCT Pub. Date: Dec. 15, 2016

(65) Prior Publication Data
US 2018/0160138 A1 Jun. 7, 2018

Related U.S. Application Data

(60) Provisional application No. 62/172,190, filed on Jun. 7, 2015.

(51) Int. Cl.
*H04N 19/102* (2014.01)
*H04N 19/137* (2014.01)
(Continued)

(52) U.S. Cl.
CPC ......... *H04N 19/517* (2014.11); *H04N 19/117* (2014.11); *H04N 19/14* (2014.11);
(Continued)

(58) Field of Classification Search
CPC .. H04N 19/517; H04N 19/583; H04N 19/117; H04N 19/46; H04N 19/176;
(Continued)

(56) References Cited

U.S. PATENT DOCUMENTS 8,711,950 B2 * 4/2014 Minamoto ........... H04N 19/139
375/240.29
8,805,100 B2 * 8/2014 Ikai ........................ G06T 9/00
375/240.16
(Continued)

FOREIGN PATENT DOCUMENTS

KR 10-2013-0041146 A 4/2013
KR 10-2014-0044775 A 4/2014
(Continued)

*Primary Examiner* — Philip P. Dang
(74) *Attorney, Agent, or Firm* — Dentons US LLP

(57) ABSTRACT

The present invention provides a method for performing deblocking filtering, comprising the steps of: identifying a transform unit (TU) boundary and a prediction unit (PU) boundary in the current block; when a neighboring PU adjacent to the current PU includes a boundary, determining an additional PU boundary extended in the boundary; determining boundary strengths (BSs) for the TU boundary, the PU boundary, and the additional PU boundary; and performing a filtering on the basis of the determined BSs.

4 Claims, 15 Drawing Sheets

(51) Int. Cl.
*H04N 19/18* (2014.01)
*H04N 19/51* (2014.01)
*H04N 19/517* (2014.01)
*H04N 19/86* (2014.01)
*H04N 19/82* (2014.01)
*H04N 19/176* (2014.01)
*H04N 19/14* (2014.01)
*H04N 19/117* (2014.01)
*H04N 19/46* (2014.01)
*H04N 19/583* (2014.01)
*H04N 19/70* (2014.01)
*H04N 19/159* (2014.01)
*H04N 19/53* (2014.01)

(52) U.S. Cl.
CPC ......... *H04N 19/159* (2014.11); *H04N 19/176* (2014.11); *H04N 19/46* (2014.11); *H04N 19/53* (2014.11); *H04N 19/583* (2014.11); *H04N 19/70* (2014.11); *H04N 19/82* (2014.11); *H04N 19/86* (2014.11)

(58) Field of Classification Search
CPC ........ H04N 19/14; H04N 19/82; H04N 19/86; H04N 19/70; H04N 19/159; H04N 19/53
See application file for complete search history.

(56) References Cited

U.S. PATENT DOCUMENTS

| | | | | |
|---|---|---|---|---|
| 8,842,924 B2* | 9/2014 | Lim | ...... | H04N 19/46 382/233 |
| 9,118,916 B2* | 8/2015 | Min | ...... | H04N 19/139 |
| 9,161,046 B2* | 10/2015 | Van der Auwera | .... | H04N 19/14 |
| 9,167,269 B2* | 10/2015 | Van der Auwera | ...... | H04N 19/117 |
| 9,232,237 B2* | 1/2016 | Sadafale | ...... | H04N 19/176 |
| 9,288,485 B2* | 3/2016 | Chono | ...... | H04N 19/159 |
| 9,414,064 B2* | 8/2016 | Narroschke | ...... | H04N 19/82 |
| 9,445,129 B2* | 9/2016 | Sasai | ...... | H04N 19/176 |
| 9,485,521 B2* | 11/2016 | Lim | ...... | H04N 19/82 |
| 9,591,306 B2* | 3/2017 | Wedi | ...... | H04N 19/50 |
| 9,667,996 B2* | 5/2017 | Chen | ...... | H04N 19/597 |
| 9,712,822 B2* | 7/2017 | Han | ...... | H04N 19/50 |
| 9,762,927 B2* | 9/2017 | Chen | ...... | H04N 19/597 |
| 9,860,528 B2* | 1/2018 | Chuang | ...... | H04N 19/51 |
| 9,894,362 B2* | 2/2018 | Sato | ...... | H04N 19/176 |
| 10,038,919 B2* | 7/2018 | Zhai | ...... | H04N 19/82 |
| 2006/0126962 A1* | 6/2006 | Sun | ...... | H04N 19/139 382/268 |
| 2013/0202048 A1* | 8/2013 | Kim | ...... | H04N 19/61 375/240.24 |
| 2014/0146891 A1* | 5/2014 | Chuang | ...... | H04N 19/70 375/240.16 |
| 2014/0204999 A1* | 7/2014 | Park | ...... | H04N 19/136 375/240.02 |
| 2015/0085935 A1 | 3/2015 | Chen et al. | | |
| 2015/0201217 A1* | 7/2015 | Lu | ...... | H04N 19/86 375/240.29 |
| 2015/0304657 A1* | 10/2015 | Lu | ...... | H04N 19/86 375/240.29 |
| 2016/0094853 A1* | 3/2016 | Ye | ...... | H04N 19/593 375/240.12 |
| 2017/0134726 A1* | 5/2017 | Sim | ...... | H04N 19/105 |

FOREIGN PATENT DOCUMENTS

| | | |
|---|---|---|
| WO | 2013-0066133 A1 | 5/2013 |
| WO | 2014-107709 A2 | 7/2014 |

\* cited by examiner

[FIG. 1]
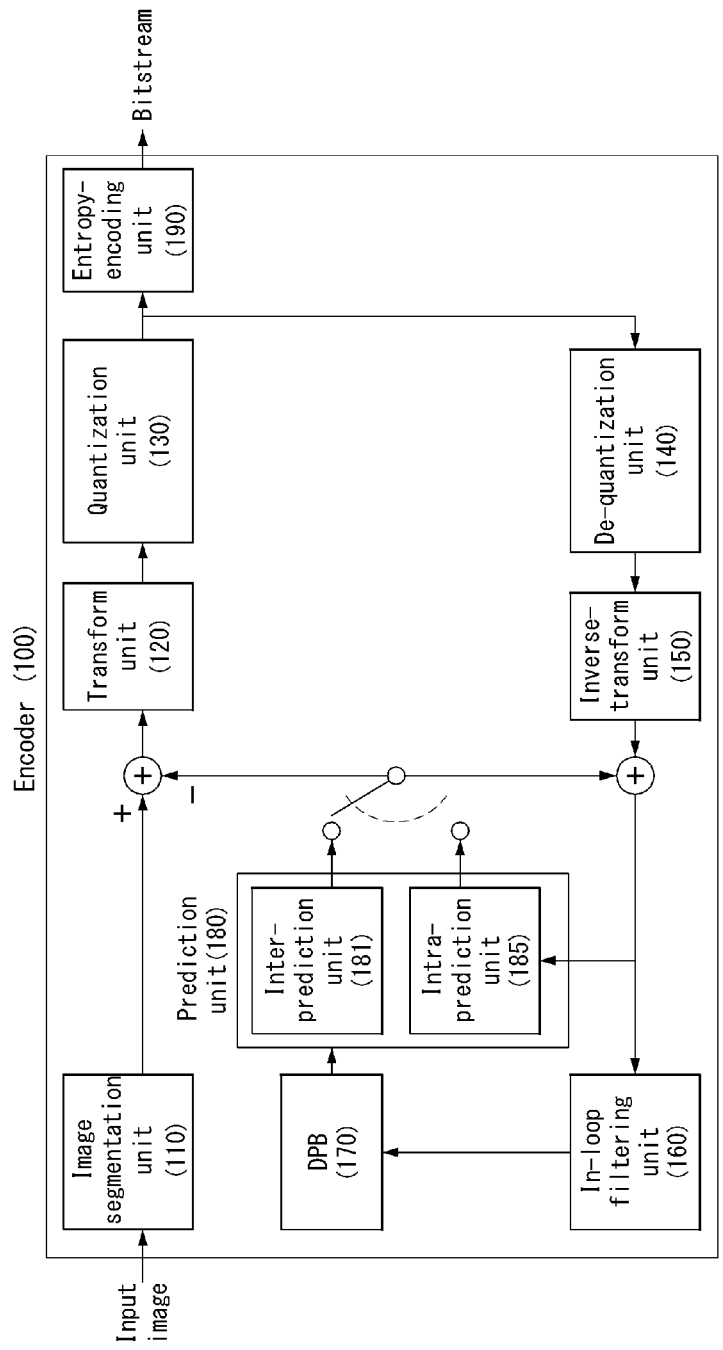

[FIG. 2]
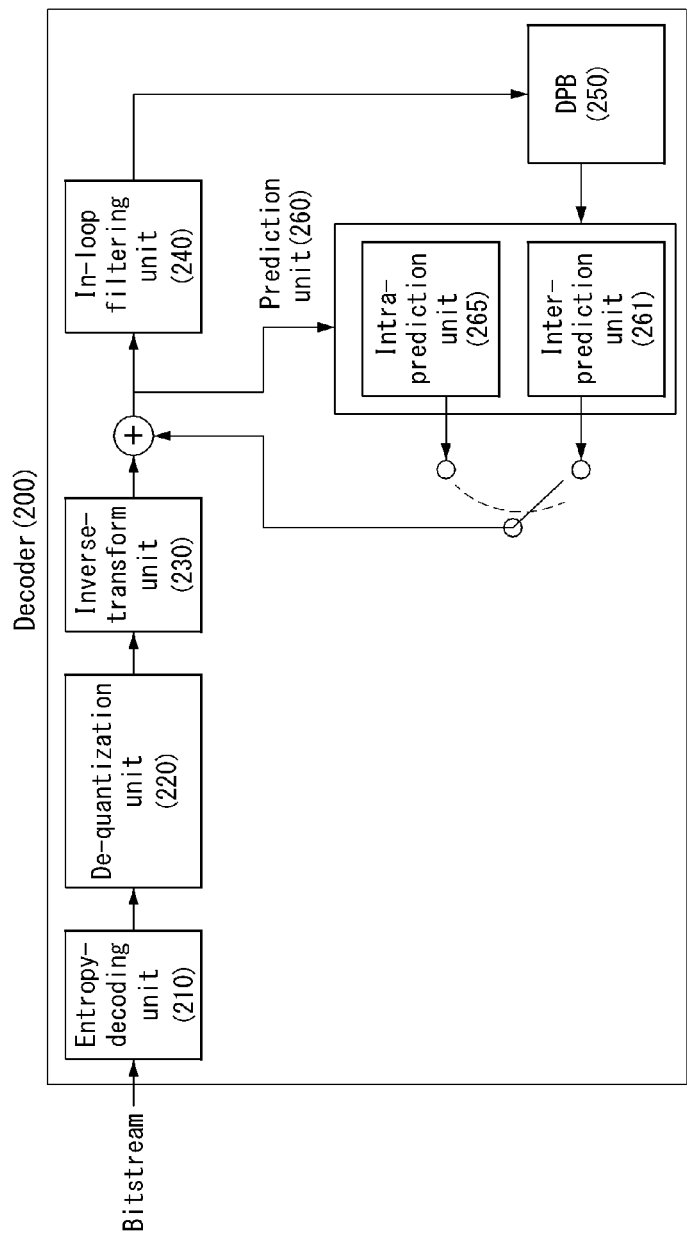

[FIG. 3]
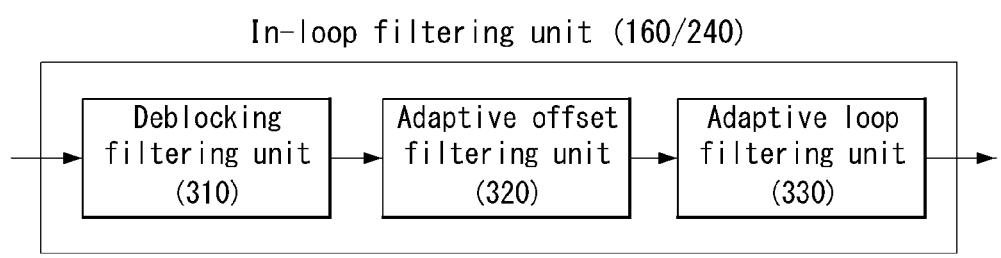

【FIG. 4】
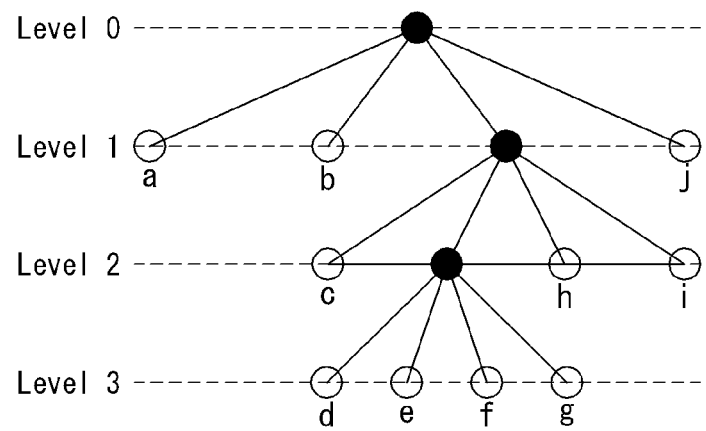
(a)
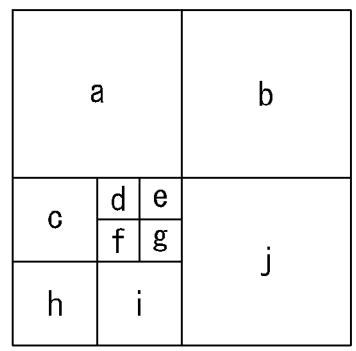
(b)

[FIG. 5]
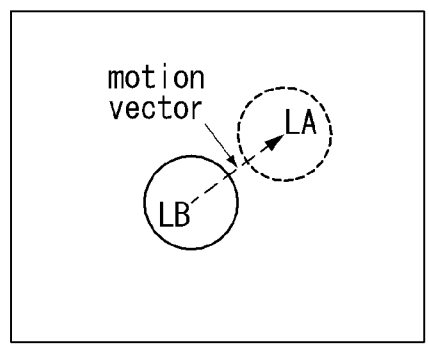
(a) Reference picture
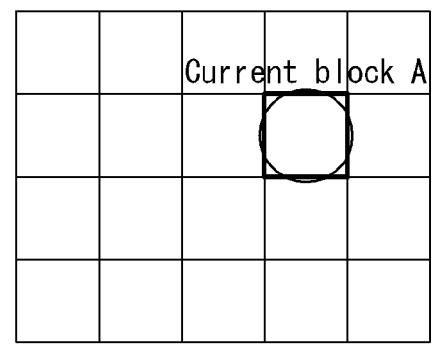
(b) Current picture

[FIG. 6]
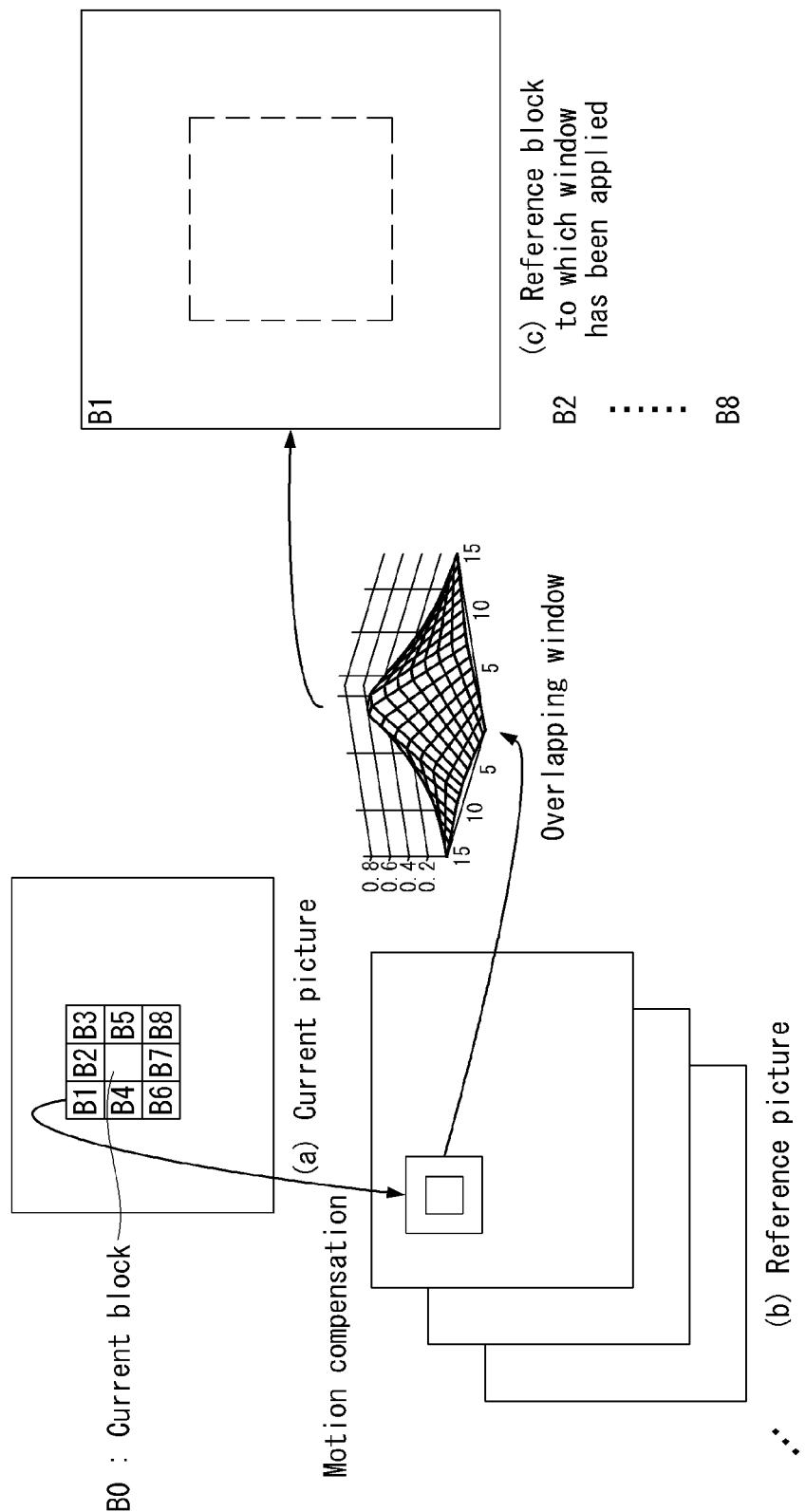

[FIG. 7]
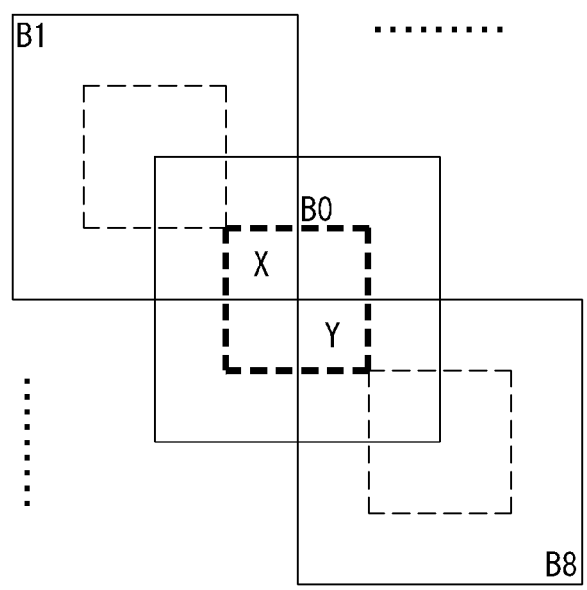
overlap motion compensated block B0

[FIG. 8]
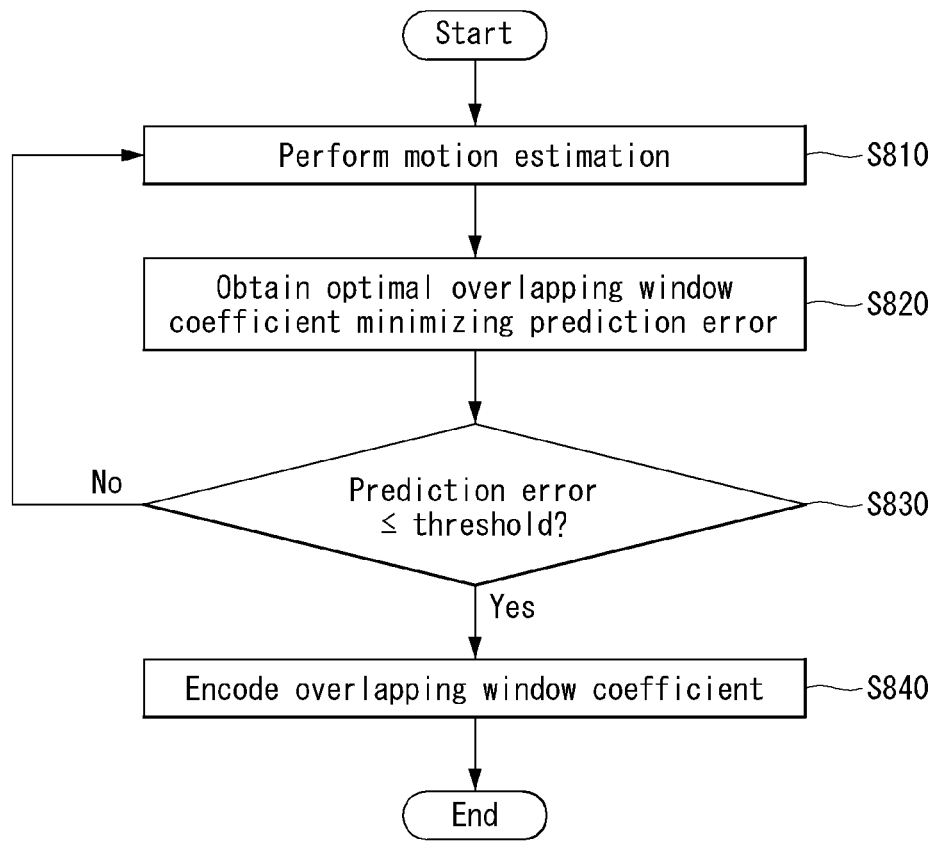

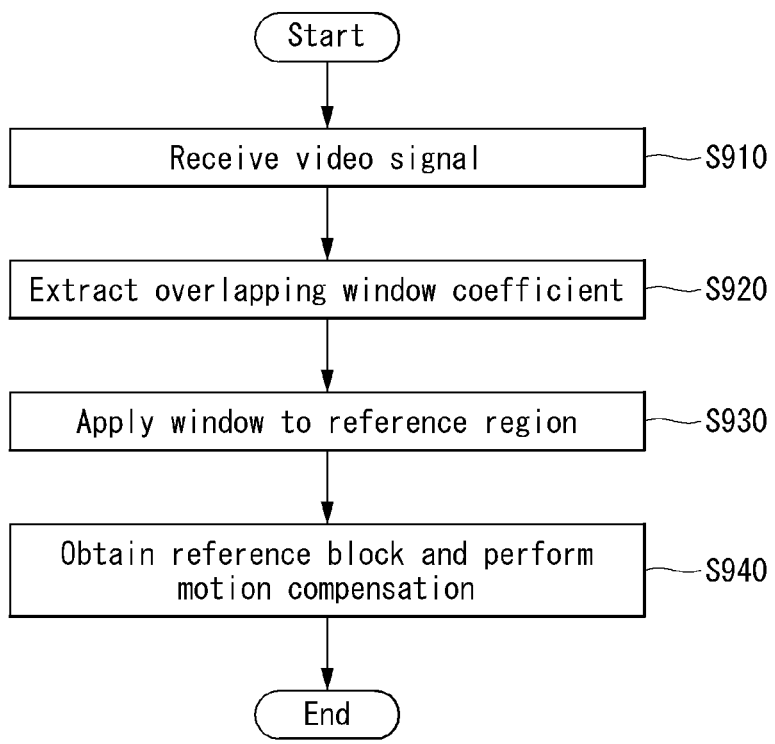
[FIG. 9]

[FIG. 10]
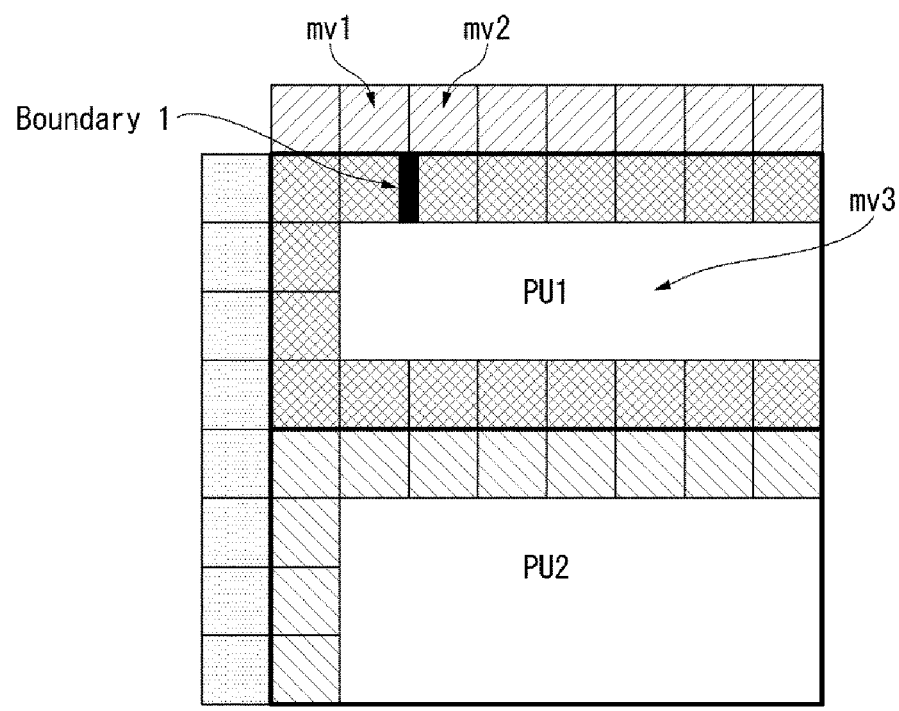

[FIG. 11]
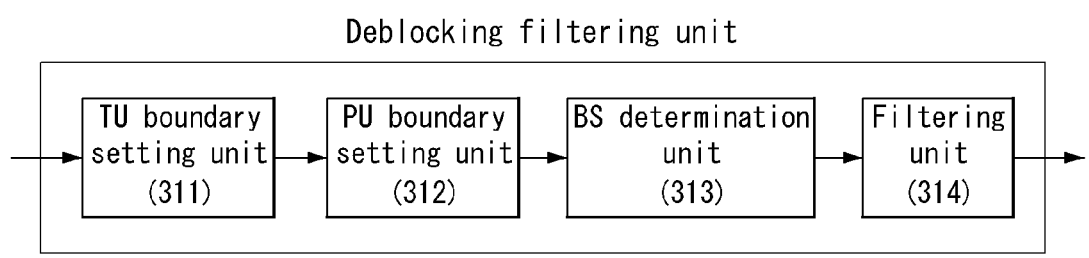

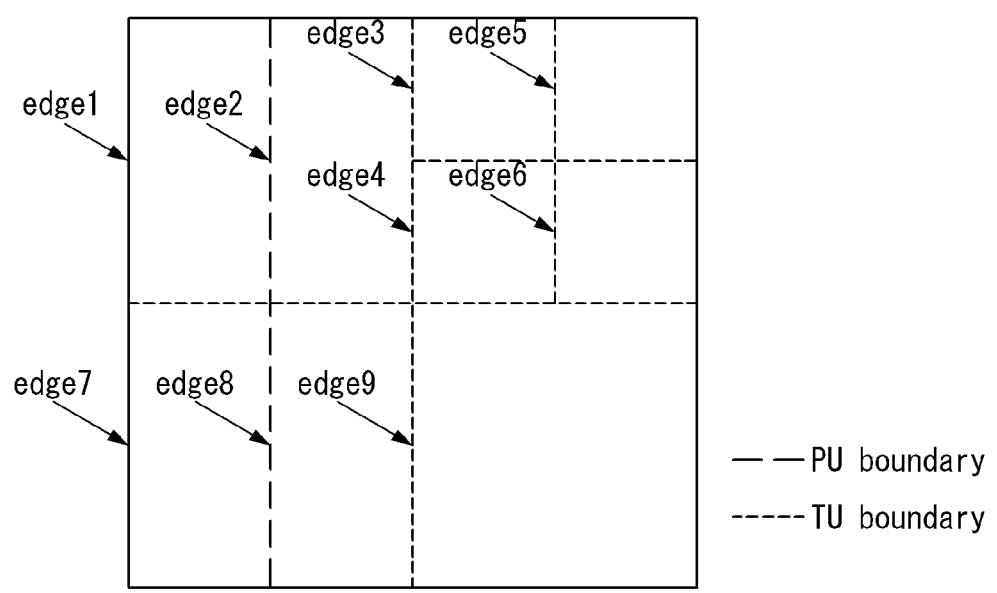
[FIG. 12]

[FIG. 13]
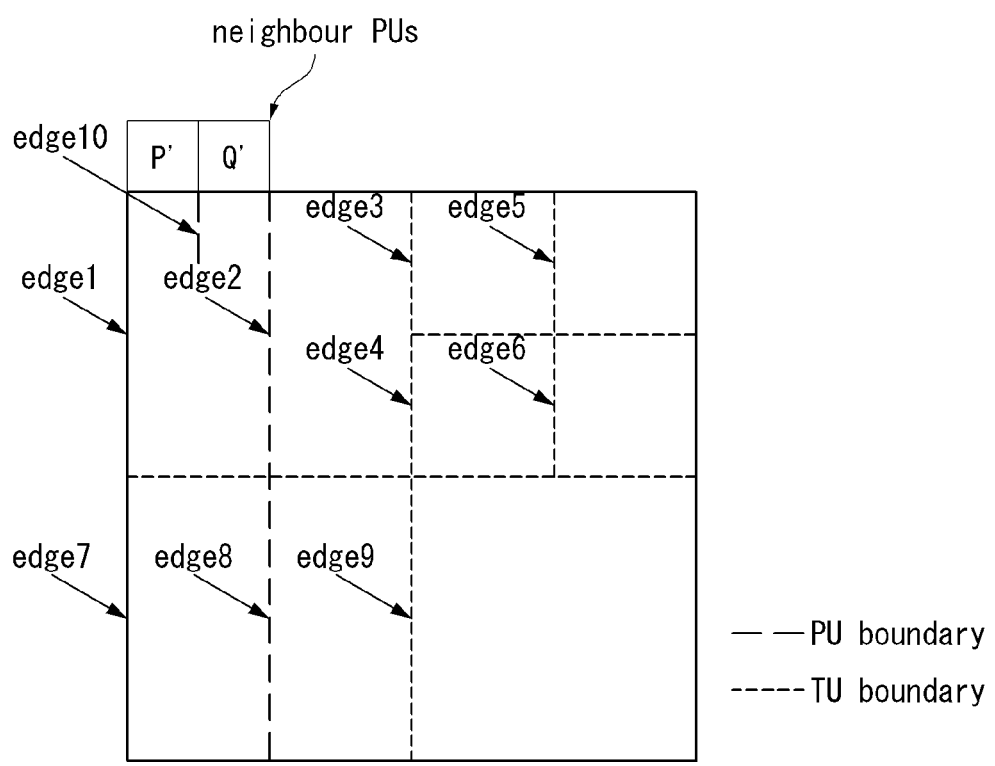

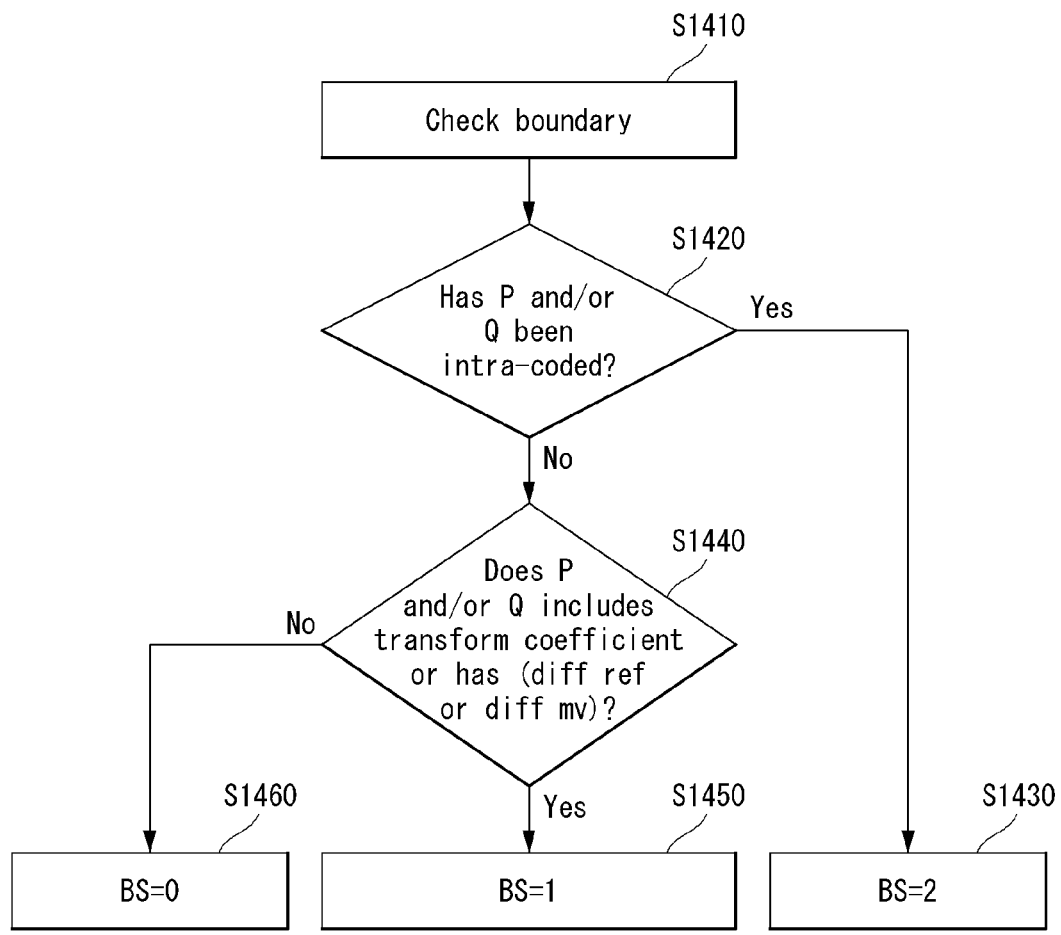
[FIG. 14]

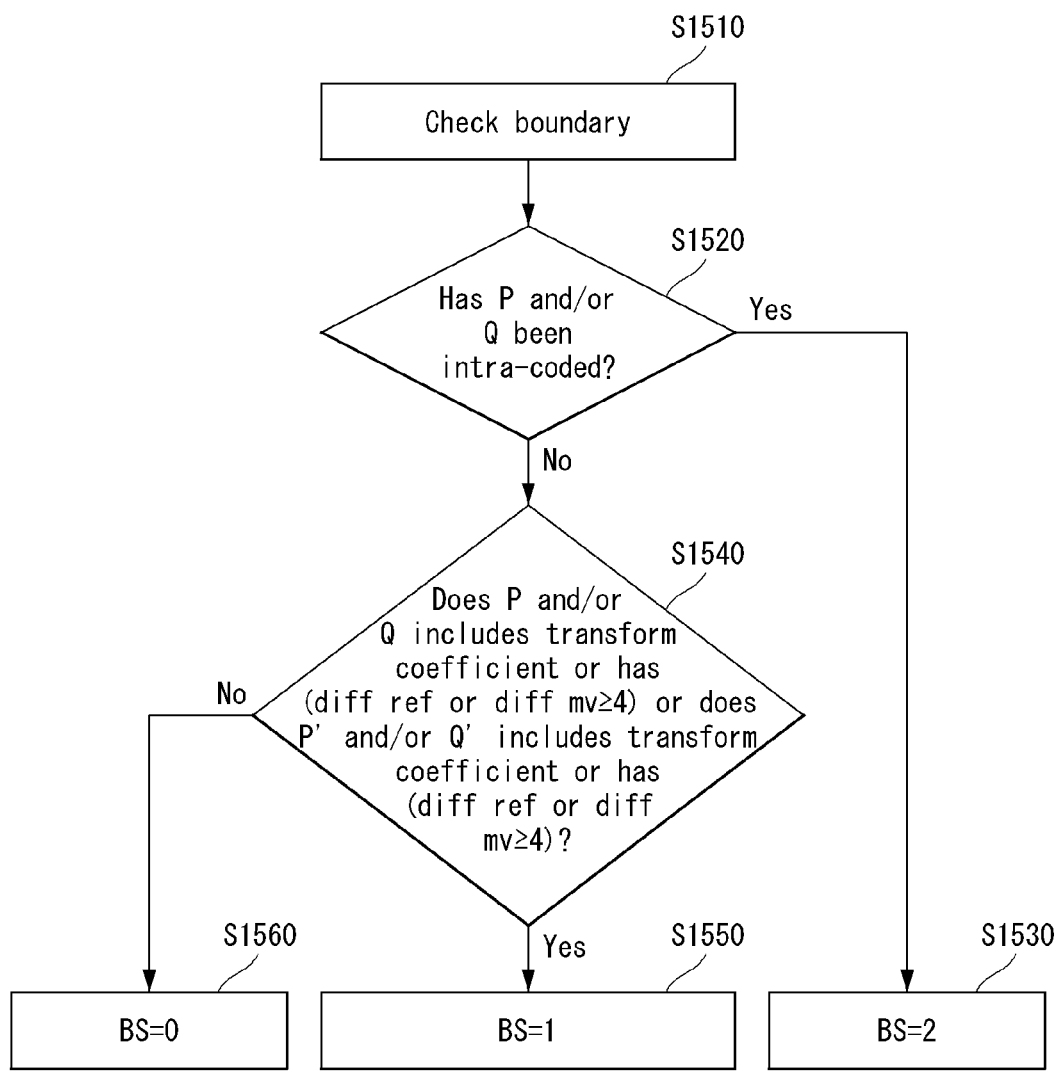
[FIG. 15]

METHOD AND DEVICE FOR PERFORMING DEBLOCKING FILTERING

CROSS-REFERENCE TO RELATED APPLICATIONS

This application is the National Stage filing under 35 U.S.C. 371 of International Application No. PCT/KR2016/005991, filed on Jun. 7, 2016, which claims the benefit of U.S. Provisional Application No. 62/172,190, filed on Jun. 7, 2015, the contents of which are all hereby incorporated by reference herein in their entirety.

TECHNICAL FIELD

The present invention relates to a method and apparatus for encoding/decoding a video signal and, more particularly, to a technology for performing deblocking filtering using overlapped block motion compensation (hereinafter referred to as "OBMC").

BACKGROUND ART

Compression coding refers to a series of signal processing technologies for transmitting digitalized information through a communication line or storing the digitalized information in a form appropriate for a storage medium. Media such as video, an image, voice, and the like, may be the subject to compression coding, and in particular, a technology for performing compression coding on video is called video compression.

Next-generation video content is expected to feature high spatial resolution, a high frame rate, and high dimensionality of scene representation. The processing of such content will bring about a significant increase in message storage, a memory access rate, and processing power.

Thus, a coding tool for effectively processing next-generation video content is required to be designed.

In particular, it is necessary to design an improved deblocking filter in order to effectively remove an additional blocking phenomenon generated when a motion compensation scheme, such as overlapped block motion compensation (OBMC), is used.

DISCLOSURE

Technical Problem

The present invention is to propose a method of improving coding efficiency through the design of an improved deblocking filter.

The present invention is to propose a method of calculating boundary strength (hereinafter referred to as "BS") by taking into consideration an overlapped block motion compensation (OBMC) region.

The present invention is to propose a method of taking into consideration an OBMC boundary newly generated due to OBMC when taking into consideration a transform unit (hereinafter referred to as a "TU") and a prediction unit (hereinafter referred to as a "PU") boundary.

The present invention is to propose a method of including a region in which blocking may be additionally generated in a PU boundary extraction process if OBMC is used.

The present invention is to propose a method of calculating BS by taking into consideration coding information of a neighbor PU.

The present invention is to improve subjective picture quality through the design of an improved deblocking filter.

Technical Solution

The present invention provides a method of designing a coding tool for high-efficiency compression.

Furthermore, the present invention provides a method of improving the function of a deblocking filter.

Furthermore, the present invention provides a method of calculating boundary strength (BS) by taking into consideration an overlapped block motion compensation (OBMC) region.

Furthermore, the present invention provides a method of taking into consideration an OBMC boundary newly generated due to OBMC when taking into consideration a transform unit (TU) and prediction unit (PU) boundary.

Furthermore, the present invention provides a method of including a region in which blocking may be additionally generated in a PU boundary extraction process if OBMC is used.

Furthermore, the present invention provides a method of calculating BS by taking into consideration coding information of a neighbor PU.

Advantageous Effects

The present invention may improve prediction performance, the quality of a reconstructed frame, and, moreover, coding efficiency through prediction filter design.

Furthermore, the present invention allows for a simpler codec design by proposing a method for designing filters performing a similar function into a single new filter based on their function.

DESCRIPTION OF DRAWINGS

FIG. 1 is a schematic block diagram of an encoder encoding a video signal according to an embodiment to which the present disclosure is applied.

FIG. 2 is a schematic block diagram of a decoder decoding a video signal according to an embodiment to which the present disclosure is applied.

FIG. 3 is a schematic internal block diagram of an in-loop filtering unit according to an embodiment to which the present disclosure is applied.

FIG. 4 is a view illustrating a partition structure of a coding unit according to an embodiment to which the present disclosure is applied.

FIG. 5 is a diagram for illustrating block-based motion compensation as an embodiment to which the present invention is applied.

FIG. 6 is a diagram for illustrating overlapped block motion compensation (OBMC) as an embodiment to which the present invention is applied.

FIG. 7 shows a frame to which overlapped block motion compensation (OBMC) has been applied as an embodiment to which the present invention is applied.

FIG. 8 shows a flowchart of performing encoding using overlapped block motion compensation (OBMC) as an embodiment to which the present invention is applied.

FIG. 9 shows a flowchart for performing decoding using overlapped block motion compensation (OBMC) as an embodiment to which the present invention is applied.

FIG. 10 is a diagram for illustrating motion compensation using overlapped block motion compensation (OBMC) as an embodiment to which the present invention is applied.

FIG. 11 shows a schematic block diagram of a deblocking filtering unit as an embodiment to which the present invention is applied.

FIG. 12 shows a TU boundary and a PU boundary within a coding unit (hereinafter referred to as a "CU") for TU boundary setting as an embodiment to which the present invention is applied.

FIG. 13 shows a TU/PU boundary and a neighbor PU within a CU for PU boundary setting as an embodiment to which the present invention is applied.

FIG. 14 is a flowchart illustrating a method of determining boundary strength (BS) as an embodiment to which the present invention is applied.

FIG. 15 is a flowchart illustrating a method of boundary strength (BS) based on coding information of a neighbor PU if OMBC is used as an embodiment to which the present invention is applied.

BEST MODE

The present invention provides a method of performing deblocking filtering, including the steps of checking a TU boundary and prediction unit (PU) boundary within a current block; determining an additional PU boundary extended from a boundary when a neighbor PU neighboring a current PU includes a boundary; determining boundary strength (BS) for the TU boundary, the PU boundary and the additional PU boundary; and performing filtering based on the determined BS.

In the present invention, the BS is determined based on at least one of whether an intra coding is performed or not, whether a transform coefficient exists or not, whether reference pictures are identical or not, and a size of a motion vector difference value.

In the present invention, the TU boundary is determined based on a split transform flag indicating whether a TU has been split.

In the present invention, the filtering comprises performing a filtering on a horizontal edge boundary in a vertical direction after performing a filtering on a vertical edge boundary in a horizontal direction.

In the present invention, the step of determining the boundary strength (BS) for the additional PU boundary includes the step of checking at least one of whether the neighbor PU includes a transform coefficient and whether the neighbor PU has a different reference picture or has a motion vector difference value of a specific value or more.

In the present invention, if the neighbor PU includes a transform coefficient or the neighbor PU has a different reference picture or a motion vector difference value of a specific value or more, the BS is determined to be 1.

The present invention provides an apparatus for performing deblocking filtering, including a TU boundary setting unit checking a TU boundary within a current block; a PU boundary setting unit checking a prediction unit (PU) boundary within the current block and determining an additional PU boundary extended from a boundary when a neighbor PU neighboring a current PU includes a boundary; a BS determination unit determining boundary strength (BS) for the TU boundary, the PU boundary and the additional PU boundary; and a filtering unit performing filtering based on the determined BS.

In the present invention, the BS determination unit checks at least one of whether the neighbor PU includes a transform coefficient and whether the neighbor PU has a different reference picture or has a motion vector difference value of a specific value or more.

MODE FOR INVENTION

Hereinafter, exemplary elements and operations in accordance with embodiments of the present invention are described with reference to the accompanying drawings. The elements and operations of the present invention that are described with reference to the drawings illustrate only embodiments, which do not limit the technical spirit of the present invention and core constructions and operations thereof.

Furthermore, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present invention should not be construed as being based on only the name of a term used in a corresponding description of this specification and that the present invention should be construed by checking even the meaning of a corresponding term.

Furthermore, terms used in this specification are common terms selected to describe the invention, but may be replaced with other terms for more appropriate analyses if other terms having similar meanings are present. For example, a signal, data, a sample, a picture, a frame, and a block may be properly replaced and interpreted in each coding process. And, partitioning, decomposition, splitting, and division may be properly replaced and interpreted in each coding process.

FIG. 1 shows a schematic block diagram of an encoder for encoding a video signal, in accordance with one embodiment of the present invention.

Referring to FIG. 1, the encoder 100 may include an image segmentation unit 110, a transform unit 120, a quantization unit 130, an inverse quantization unit 140, an inverse transform unit 150, an in-loop filtering unit 160, a decoded picture buffer (DPB) 170, a prediction unit 180, and an entropy-encoding unit 190. The prediction unit 180 may include an inter-prediction unit 181 and an intra-prediction unit 185.

The image segmentation unit 110 may divide an input image (or, a picture, a frame) input to the encoder 100 into one or more process units. For example, the process unit may be a coding tree unit (CTU), a coding unit (CU), a prediction unit (PU), or a transform unit (TU).

However, the terms are used only for convenience of illustration of the present disclosure. The present invention is not limited to the definitions of the terms. In this specification, for convenience of illustration, the term "coding unit" or "target unit" is employed as a unit used in a process of encoding or decoding a video signal. However, the present invention is not limited thereto. Another process unit may be appropriately selected based on contents of the present disclosure.

The encoder 100 may generate a residual signal by subtracting a prediction signal output from the inter-prediction unit 181 or intra prediction unit 185 from the input image signal. The generated residual signal may be transmitted to the transform unit 120.

The transform unit 120 may apply a transform technique to the residual signal to produce a transform coefficient. The transform process may be applied to a pixel block having the same size of a square, or to a block of a variable size other than a square.

The quantization unit 130 may quantize the transform coefficient and transmits the quantized coefficient to the entropy-encoding unit 190. The entropy-encoding unit 190 may entropy-code the quantized signal and then output the entropy-coded signal as bit streams.

The quantized signal output from the quantization unit 130 may be used to generate a prediction signal. For example, the quantized signal may be subjected to an inverse quantization and an inverse transform via the inverse quantization unit 140 and the inverse transform unit 150 in the loop respectively to reconstruct a residual signal. The reconstructed residual signal may be added to the prediction signal output from the inter-prediction unit 181 or intra-prediction unit 185 to generate a reconstructed signal.

Meanwhile, in the compression process, adjacent blocks may be quantized by different quantization parameters, so that deterioration of the block boundary may occur. This phenomenon is called blocking artifacts. This is one of important factors for evaluating image quality. A filtering process may be performed to reduce such deterioration. Using the filtering process, the blocking deterioration may be eliminated, and, at the same time, an error of a current picture may be reduced, thereby improving the image quality.

The in-loop filtering unit 160 applies filtering to a reconstructed signal and outputs it to a reproducing device or transmits it to the decoded picture buffer 170. That is, the in-loop filtering unit 160 may perform a filtering process for minimizing the difference between an original image and a reconstructed image.

A filtered signal transmitted to the decoded picture buffer 170 may be transmitted to the prediction filtering unit (not shown) and re-filtered to improve prediction performance. The prediction filtering unit may perform a filtering process for minimizing the difference between an original image and a reference image. For example, the prediction filtering unit may perform filtering using a Wiener filter.

The signal stored in the decoded picture buffer 170 may be transmitted to the prediction unit 180 and used to generate a prediction signal. For example, the filtered signal may be used as a reference picture in the inter-prediction unit 181. The picture filtered as described above is used as a reference picture in the inter-frame prediction mode, thereby being capable of improving coding efficiency. Meanwhile, the prediction filtering unit may be illustrated as a unit different from the prediction unit 180 or may be located within the prediction unit 180 or may be configured along with a different unit.

The decoded picture buffer 170 may store an in-loop filtered picture or prediction filtered picture to store them as a reference picture in the inter-prediction unit 181.

The inter-prediction unit 181 performs temporal prediction and/or spatial prediction to eliminate temporal redundancy and/or spatial redundancy by referring to a reconstructed picture or a picture filtered through the prediction filtering unit 175. Here, the reference picture used for performing prediction is a transformed signal that has passed through quantization and inverse quantization for each block previously at the time of coding/decoding, so blocking artifacts or ringing artifacts may exist.

Accordingly, in order to solve performance degradation caused by such signal discontinuity or quantization, the inter-prediction unit 181 may interpolate an inter-pixel signal for each subpixel by using a lowpass filter. Here, a subpixel refers to a virtual pixel generated using an interpolation filter, and an integer pixel refers to an actual pixel that exists in a reconstructed picture. Methods of interpolation may include linear interpolation, a bi-linear interpolation, Wiener filter, etc.

The interpolation filter may be used for a reconstructed picture to improve prediction accuracy. For example, the inter-prediction unit 181 may generate an interpolated pixel by applying the interpolation filter to an integer pixel, and may perform prediction by using an interpolated block consisting of interpolated pixels as a prediction block.

The intra-prediction unit 185 may predict the current block by referring to samples adjacent to a block for which coding is currently to be performed. The intra-prediction unit 185 may perform the following process in order to perform intra-prediction. First, a reference sample required to generate a prediction signal may be prepared. Then, a prediction signal may be generated using the prepared reference sample. Afterwards, prediction modes are coded. In this instance, the reference sample may be prepared through reference sample padding and/or reference sample filtering. The reference sample may have a quantization error since it has undergone prediction and reconstruction processes. Accordingly, in order to reduce such errors, a reference sample filtering process may be performed for each prediction mode used for intra-prediction.

A prediction signal generated by the inter-prediction unit 181 or the intra-prediction unit 185 may be used to generate a reconstruction signal or a residual signal.

FIG. 2 shows a schematic block diagram of a decoder for decoding a video signal, in accordance with one embodiment of the present invention.

Referring to FIG. 2, the decoder 200 may include an entropy decoding unit 210, an inverse quantization unit 220, an inverse transform unit 230, an in-loop filtering unit 240, a decoded picture buffer (DPB) 250, and a prediction unit 260. The prediction unit 260 may include an inter-prediction unit 261 and an intra-prediction unit 265.

A reconstructed video signal output from the decoder 200 may be played using a playback device.

The decoder 200 may receive the signal output from the encoder as shown in FIG. 1. The received signal may be entropy-decoded via the entropy-decoding unit 210.

The inverse quantization unit 220 may obtain a transform coefficient from the entropy-decoded signal using quantization step size information.

The inverse transform unit 230 may inverse-transform the transform coefficient to obtain a residual signal.

A reconstructed signal may be generated by adding the obtained residual signal to the prediction signal output from the inter-prediction unit 260 or the intra-prediction unit 265.

The in-loop filtering unit 240 may perform filtering using a filter parameter, and a filtered reconstruction signal may be output to a reproducing device or stored in the decoded picture buffer 250. That is, the in-loop filtering unit 240 may perform a filtering process for minimizing the difference between an original image and a reconstructed image. In this case, the filter parameter may be transmitted from the encoder, or may be derived from other coding information.

A filtered signal transmitted to the decoded picture buffer 250 may be transmitted to the prediction filtering unit (not shown) and re-filtered to improve prediction performance. The prediction filtering unit may perform a filtering process for minimizing the difference between an original image and a reference image. For example, the prediction filtering unit may perform filtering using a Wiener filter.

The filtered signal may be transmitted to the prediction unit 260 and used to generate a prediction signal. For example, the signal filtered through the prediction filtering unit 255 may be used as a reference picture in the inter-prediction unit 261. The picture filtered as described above is used as reference picture in the inter-frame prediction mode, thereby being capable of improving coding efficiency.

The decoded picture buffer 250 may store an in-loop filtered picture or prediction filtered picture to store them as a reference picture in the inter-prediction unit 261.

In this specification, the exemplary embodiments explained with respect to the in-loop filtering unit 160, inter-prediction unit 181, and intra-prediction unit 185 of the encoder 100 may equally apply to the in-loop filtering unit 240, inter-prediction unit 261, and intra-prediction unit 265 of the decoder 200.

FIG. 3 is a schematic internal block diagram of an in-loop filtering unit according to an embodiment to which the present disclosure is applied.

The in-loop filtering unit may include at least one of a deblocking filtering unit 310, an adaptive offset filtering unit 320, and an adaptive loop filtering unit 330.

The in-loop filtering unit may apply filtering to a reconstructed picture and output it to a reproducing device or store it in a buffer to use it as a reference picture in an inter-prediction mode.

The deblocking filtering unit 310 may perform a function of improving distortion occurring at a boundary of a reconstructed picture. For example, it may improve blocking deterioration occurring at a boundary of a prediction unit or transform unit.

First, the deblocking filtering unit 310 may check for a discontinuity in reconstructed pixel values at block boundaries, and if blocking deterioration occurs, it may perform deblocking filtering at the corresponding edge boundary. For example, it is determined whether the block boundary is an 8×8 block boundary and at the same time a boundary of a prediction unit or transform unit, and the boundary strength (BS) value may be calculated based on the determination. Whether to perform filtering or not may be determined based on the boundary strength (BS) value. In this case, a filter parameter may be used as well.

An embodiment of the present invention provides a method of calculating boundary strength (BS) by taking into consideration an overlapped block motion compensation (OBMC) region.

An embodiment of the present invention provides a method of setting a TU and PU boundary by taking into consideration an OBMC boundary newly generated due to OBMC.

An embodiment of the present invention provides a method of including a region in which blocking may be additionally generated in a PU boundary extraction process if OBMC is used.

An embodiment of the present invention is to propose a method of calculating BS by taking into consideration coding information of a neighbor PU.

The adaptive offset filtering unit 320 may perform a function of minimizing the error between a reconstructed image and an original image by adding an offset to reconstructed pixels. Here, the reconstructed image may refer to a deblocking filtered image. The encoder may calculate an offset parameter for correcting for the error between the reconstructed image and the original image and transmit it to the decoder, and the decoder may entropy-decode the transmitted offset parameter and then perform filtering for each pixel based on that offset parameter.

The adaptive loop filtering unit 330 may calculate an optimum coefficient for minimizing the error between the original image and the reconstructed image and perform filtering. The encoder may derive a filter coefficient for minimizing the error between the original image and the reconstructed image, and adaptively transmit to the decoder information about whether to apply adaptive loop filtering for each block and the filter coefficient. The decoder may perform filtering based on the transmitted information about whether to apply adaptive loop filtering and the transmitted filter coefficient.

FIG. 4 is a view illustrating a partition structure of a coding unit according to an embodiment to which the present disclosure is applied.

An encoder may partition an image (or picture) by rectangular coding tree units (CTUs). Also, the encoder sequentially encodes the CTUs one after another in raster scan order.

For example, a size of the CTU may be determined to any one of 64×64, 32×32, and 16×16, but the present disclosure is not limited thereto. The encoder may selectively use a size of the CTU depending on resolution or characteristics of an input image. The CTU may include a coding tree block (CTB) regarding a luma component and a CTB regarding two chroma components corresponding thereto.

One CTU may be decomposed into a quadtree (QT) structure. For example, one CTU may be partitioned into four equal-sized square units and having each side whose length is halved each time. Decomposition according to the QT structure may be performed recursively.

Referring to FIG. 4, a root node of the QT may be related to the CTU. The QT may be divided until it reaches a leaf node, and here, the leaf node may be termed a coding unit (CU).

The CU may be a basic unit for coding based on which processing an input image, for example, intra/inter prediction is carried out. The CU may include a coding block (CB) regarding a luma component and a CB regarding two chroma components corresponding thereto. For example, a size of the CU may be determined to any one of 64×64, 32×32, 16×16, and 8×8, but the present disclosure is not limited thereto and the size of the CPU may be increased or diversified in the case of a high definition image.

Referring to FIG. 4, the CTU corresponds to a root node and has a smallest depth (i.e., level 0). The CTU may not be divided depending on characteristics of an input image and, in this case, the CTU corresponds to a CU.

The CTU may be decomposed into a QT form and, as a result, lower nodes having a depth of level 1 may be generated. A node (i.e., a leaf node) which is not partitioned any further, among the lower nodes having the depth of level 1, corresponds to a CU. For example, in FIG. 4(*b*), CU(a), CU(b), and CU(j) respectively corresponding to nodes a, b, and j have been once partitioned and have the depth of level 1.

At least one of the nodes having the depth of level 1 may be divided again into the QT form. Also, a node (i.e., a leaf node) which is not divided any further among the lower nodes having a depth of level 2 corresponds to a CU. For example, in FIG. 4(*b*), CU(c), CU(h), and CU(i) respectively corresponding to nodes c, h, and I have been divided twice and have the depth of level 2.

Also, at least one of the nodes having the depth of level 2 may be divided again in the QT form. Also, a node (leaf node) which is not divided any further among the lower nodes having a depth of level 3 corresponds to a CU. For example, in FIG. 4(*b*), CU(d), CU(e), CU(f), and CU(g)

respectively corresponding to nodes d, e, f, and g have been divided three times and have the depth of level 3.

In the encoder, the largest size or smallest size of the CU may be determined according to characteristics (e.g., resolution) of a video image or in consideration of efficiency of coding. Also, information regarding the determined largest size or smallest size of the CU or information deriving the same may be included in a bit stream. A CU having the largest size may be termed the largest coding unit (LCU) and a CU having the smallest size may be termed the smallest coding unit (SCU).

Also, the CU having a tree structure may be hierarchically divided with predetermined largest depth information (or largest level information). Also, each of the divided CUs may have depth information. Since the depth information represents the number by which a CU has been divided and/or a degree to which the CU has been divided, the depth information may include information regarding a size of the CU.

Since the LCU is divided into the QT form, a size of the SCU may be obtained using a size of the LCU and largest depth information. Or, conversely, a size of the LCU may be obtained using the size of the SCU and largest depth information of a tree.

Regarding one CU, information representing whether the corresponding CU is partitioned may be delivered to the decoder. For example, the information may be defined as a split flag and represented by a syntax element "split_cu_flag". The split flag may be included in every CU except for the SCU. For example, if the value of the split flag is '1', the corresponding CU is partitioned again into four CUs, while if the split flag is '0', the corresponding CU is not partitioned further, but a coding process with respect to the corresponding CU may be carried out.

Although the embodiment of FIG. 4 has been described with respect to a partitioning process of a CU, the QT structure may also be applied to the transform unit (TU) which is a basic unit carrying out transformation.

A TU may be partitioned hierarchically into a quadtree structure from a CU to be coded. For example, the CU may correspond to a root node of a tree for the TU.

Since the TU may be partitioned into a QT structure, the TU partitioned from the CU may be partitioned into smaller TUs. For example, the size of the TU may be determined by any one of 32×32, 16×16, 8×8, and 4×4. However, the present invention is not limited thereto and, in the case of a high definition image, the TU size may be larger or diversified.

For each TU, information regarding whether the corresponding TU is partitioned may be delivered to the decoder. For example, the information may be defined as a split transform flag and represented as a syntax element "split_transform_flag".

The split transform flag may be included in all of the TUs except for a TU having a smallest size. For example, when the value of the split transform flag is '1', the corresponding CU is partitioned again into four TUs, and when the split transform flag is '0', the corresponding TU is not partitioned further.

As described above, a CU is a basic coding unit, based on which intra- or inter-prediction is carried out. In order to more effectively code an input image, a CU can be decomposed into prediction units (PUs).

A PU is a basic unit for generating a prediction block; prediction blocks may be generated differently in units of PUs even within one CU. A PU may be partitioned differently according to whether an intra-prediction mode or an inter-prediction mode is used as a coding mode of the CU to which the PU belongs.

FIG. 5 is a diagram for illustrating block-based motion compensation as an embodiment to which the present invention is applied.

Referring to FIG. 5, a current picture is split into blocks of a specific size. In order to estimate a motion of the current block A of the blocks, a reference block B most similar to the current block A is searched for within the reference picture FIG. 5(*a*). In this case, an offset between a co-location ($L_A$) with the current block A and the location ($L_B$) of the reference block B is a motion vector. The current block may be reconstructed by searching for a reference block most similar to the current block using such a motion vector, obtaining a predictor of the current block, and adding a residual signal to the predictor.

A technology for performing motion compensation based on a block as described above is efficient in removing redundancy between neighboring frames, but has a disadvantage in that a blocking artifact is generated at the boundary of blocks. There is a problem in that coding efficiency is reduced due to the blocking artifact and picture quality is also deteriorated. Accordingly, in order to solve the problem, an overlapping block-based motion compensation (OBMC) method may be used.

FIG. 6 is a diagram for illustrating overlapped block motion compensation (OBMC) as an embodiment to which the present invention is applied.

Referring to FIG. 6(*a*), it may be seen that a current block B0 and neighbor blocks B1, . . . , B8 surrounding the current block are present. Referring to FIG. 6(*b*), reference blocks to which an overlapping window has been applied may be generated as in FIG. 6(*c*) by applying the overlapping window to each of reference blocks B1, . . . , B8 respectively corresponding to the neighbor blocks B1, . . . , B8 of the current block within a reference picture.

The window may have relatively great weight placed at its central part and may have relatively small weight placed at its edge part. In this case, the window is applied to a region including the reference block B1 and a surrounding portion thereof in addition to a region corresponding to the reference block b1. In this case, the window may be fixed, but may be adaptively differently applied for each sequence, frame, slice or macroblock.

FIG. 7 shows a frame to which overlapped block motion compensation (OBMC) has been applied as an embodiment to which the present invention is applied.

Referring to FIG. 7, it may be seen that a plurality of reference regions B1, . . . , B8 to which a window has been applied are overlapped. In this case, a reference block B0 corresponding to a current block may be obtained from a commonly overlapped region. For example, the first reference region B1 overlaps the left top region X of the reference block B0 corresponding to the current block, and the eighth reference region B8 overlaps the right bottom region of the reference block B0 corresponding to the current block. If the reference block B0 corresponding to the current block is obtained from the overlapped region as described above, a blocking artifact in a block boundary can be removed, and the amount of bits of a residual signal can be minimized because the most appropriate prediction signal can be obtained.

FIG. 8 shows a flowchart of performing encoding using overlapped block motion compensation (OBMC) as an embodiment to which the present invention is applied.

The encoder may perform motion estimation in order to obtain a motion vector (S810). The motion estimation is to search for a region in which energy within a motion-compensated error (a difference between a current block and a reference region) is minimized. In this case, in general, a process of evaluating error energy at many points is required. Selecting a method of measuring energy affects computational complexity and accuracy of a motion estimation process.

Meanwhile, in performing motion estimation, a full search method and a fast search method may be used. In the full search method, the sum of absolute error (SAE) in each point within a window is calculated. First, while the window is outward moved in a spiral direction from an initial search location at the center, full search may be performed. The full search method can search for the least SAE, but may require a great computational load because energy must be measured at all of locations.

The fast search method is a method of measuring energy with respect to some of locations within a search window, and includes methods, such as a three step search (TSS) (N-step search), logarithmic search, and nearest neighbours search.

The best overlapping window coefficient w that minimizes a total prediction error E may be obtained using the motion vector obtained at step S810 as described above (S820). In this case, the overlapping window coefficient w may be different depending on a sequence, frame, slice or block.

Furthermore, the encoder may check whether the prediction error is smaller than or equal to a threshold (S830).

If the prediction error is smaller than or equal to the threshold, the encoder may encode the overlapping window coefficient and transmit it to the decoder (S840).

However, if the prediction error is greater than the threshold, the encoder may repeatedly perform steps S810 and S820.

FIG. 9 shows a flowchart for performing decoding using overlapped block motion compensation (OBMC) as an embodiment to which the present invention is applied.

The decoder may receive a video signal including an overlapping window coefficient w (S910), and may extract the overlapping window coefficient w from the video signal (S920).

The decoder may overlap a window with each reference region of a reference picture in multiple ways by applying the window with each reference region of the reference picture using the overlapping window coefficient w (S930).

The decoder obtains a reference block from the multi-overlapped reference region, and performs motion compensation using the obtained reference block as a predictor of the current block (S940).

FIG. 10 is a diagram for illustrating motion compensation using overlapped block motion compensation (OBMC) as an embodiment to which the present invention is applied.

An embodiment of the present invention is to design an improved deblocking filter in order to effectively remove an additional blocking phenomenon generated when a new motion compensation scheme, such as overlapped block motion compensation (OBMC), is used. Accordingly, further improved subjective picture quality can be obtained.

The block-based motion compensation scheme generates more residual signals toward a block boundary. This generates more information when quantization/dequantization is performed and generates more errors in a block boundary, thereby deteriorating compression efficiency and also making a blocking phenomenon severe.

In order to solve such problems, in the present invention, when motion compensation of a current block is performed, the OBMC technology in which the motion vector of a surrounding block in addition to the motion vector of the current block is also used and an overlapping window is used for an overlapped region may be used. If the OBMC is used, a residual signal concentration phenomenon is reduced.

FIG. 10 shows an example in which OBMC is performed. Unlike in the existing motion compensation, motion compensation of portions corresponding to the boundary of a PU1 is performed mv 3 and mv 1, and mv 3 and mv 2 depending on locations. In this case, the final motion-compensated block can be generated by overlapping the blocks of the two regions using a proper overlapping window. In this case, a "boundary 1" is a region within the PU1 in the existing motion compensation and is thus excluded from the subject of the deblocking filter unless it is the boundary of a transform unit (TU). However, if the motion vectors of mv 1 and mv 2 are different, there is a possibility that additional blocking may occur in the boundary 1 because OBMC is performed.

Accordingly, the present invention provides a method of including a region in which blocking may be additionally generated in a PU boundary extraction process if OBMC is used as in the boundary 1.

Furthermore, the present invention provides a method of calculating BS by taking into consideration both mv 1 and mv 3 and the reference picture of a corresponding block when calculating the BS.

FIG. 11 shows a schematic block diagram of a deblocking filtering unit as an embodiment to which the present invention is applied.

The deblocking filtering unit to which the present invention is applied may include at least one of a TU boundary setting unit 311, a PU boundary setting unit 312, a BS determination unit 313 and a filtering unit 314.

The TU boundary setting unit 311 may check a TU boundary for each sub-TU. In this case, in order to check the TU boundary, a split transform flag (split_transform_flag [x_pos][y_pos][depth]) may be used. In this case, x_pos indicates a horizontal position from the left top of a CU, y_pos indicates a vertical position from the left top of the CU, and depth indicates a TU depth.

For example, if split_transform_flag[0][0][0]=1, an operation of increasing the depth by 1 and checking a value of split_transform_flag again with respect to a sub-TU is recursively repeated. If split_transform_flag[0][0][0]=0, a TU boundary is checked. Referring to FIG. 12, edges 1, 3, 4, 5, 6, 7 and 9 may be determined TU boundaries.

The PU boundary setting unit 312 checks the boundary of a PU partition location as an edge based on PU partition information. For example, the CU of FIG. 12 has partition mode PartMode of nL×2N, and thus edges 2 and 8 are determined to be PU boundaries.

When the PU boundary or the TU boundary is checked, the BS determination unit 313 may determine BS based on information of neighbor blocks of a corresponding boundary.

First, the BS determination unit 313 may check whether a block P or Q neighboring the boundary has been intra-coded. In this case, in the case of a vertical boundary, P indicates a left block neighboring the vertical boundary and Q indicates a right block neighboring the vertical boundary. Furthermore, in the case of a horizontal boundary, P indicates an upper block neighboring a horizontal boundary, and Q indicates a lower block neighboring a vertical boundary.

For example, if an intra-coded block of the block P or Q neighboring the boundary is present, BS may be determined to be 2.

If an intra-coded block of the block P or Q neighboring the boundary is not present, whether any one of the following conditions is satisfied may be checked.

(i) Whether the block P or Q neighboring the boundary includes a transform coefficient?

(ii) Whether the block P or Q neighboring the boundary has a different reference picture or has a motion vector difference value of 4 or more?

If any one of the conditions is satisfied, BS may be determined to be 1. If any one of the conditions is not satisfied, BS may be determined to be 0.

In another embodiment of the present invention, if OBMC is performed using a neighbor PU, the BS determination unit 313 may additionally determine the edge 10 to be a PU boundary if the neighbor PU adjacent as in FIG. 13 has a boundary.

In this case, the aforementioned BS value determination process may be applied.

Furthermore, in the case of the edge 10, the BS determination unit 313 may determine a BS value for the edge 10 by taking into consideration whether neighbor PUs include a transform coefficient or whether the neighbor PUs have different reference pictures or have a motion vector difference value of 4 or more.

If the BS value is determined as described above, the filtering unit 314 may perform filtering based on the determined BS value.

In this specification, OBMC has been described by taking a case where an adjacent neighbor PU has a boundary as an example, but the present invention is not limited thereto. The concept of the present invention may be applied if a boundary is generated due to a different process. For example, the process of generating a boundary may include a case where motion estimation or motion compensation is performed for each sub-block or a case where boundary smoothing is applied.

FIG. 12 shows a TU boundary and a PU boundary within a CU for TU boundary setting as an embodiment to which the present invention is applied.

In an embodiment of the present invention, a BS value may be calculated if a current edge boundary is a block boundary and is also a PU boundary or TU boundary.

Before deblocking filtering is performed, first, a TU boundary may be checked for each sub-TU. In order to check the TU boundary, split_transform_flag[x_pos][y_pos][depth] may be used.

For example, if split_transform_flag[0][0][0]=1, an operation of increasing the depth by 1 and checking a value of split_transform_flag again for a sub-TU is recursively repeated. If split_transform_flag[0][0][0]=0, a TU boundary is checked. Referring to FIG. 12, edges 1, 3, 4, 5, 6, 7 and 9 may be determined to be TU boundaries.

Furthermore, referring to, FIG. 12, the CU has partition mode PartMode of nL×2N, and thus edges 2 and 8 may be determined to be PU boundaries.

FIG. 13 shows a TU/PU boundary and a neighbor PU within a CU for PU boundary setting as an embodiment to which the present invention is applied.

In relation to PU boundary setting, the boundary of a PU partition location may be checked based on PU partition information. For example, the CU of FIG. 12 has partition mode PartMode of nL×2N, and thus edges 2 and 8 may be determined to be PU boundaries.

In the present invention, if OBMC is performed using a neighbor PU, a PU boundary may be additionally determined by checking whether a neighbor PU has a boundary and filtering may be performed on the PU boundary.

From FIG. 13, it may be seen that the neighbor PU has a boundary. In this case, the edge 10 may be additionally determined to be a PU boundary.

Meanwhile, when a BS value is determined, in the case of the edge 10, the BS value for the edge 10 may be determined by taking into consideration whether neighbor PUs include a coded coefficient or the neighbor PUs have a different reference picture or a motion vector difference value of a specific value (for example, 4) or more.

FIG. 14 is a flowchart illustrating a method of determining boundary strength (BS) as an embodiment to which the present invention is applied.

When the PU boundary or the TU boundary are checked as described above (S1410), BS may be determined based on information of neighbor blocks of a corresponding boundary.

First, whether a block P or Q neighboring the boundary has been intra-coded may be checked (S1420). A BS value is differently set depending on intra-coding or inter-coding. In the case of intra-coding, a greater BS value is set.

If, as a result of the check, an intra-coded block of the blocks P or Q neighboring the boundary is present, BS may be determined to be 2 (S1430).

If an intra-coded block of the blocks P or Q neighboring the boundary is not present, whether any one of the following conditions is satisfied may be checked (S1440).

(i) Whether the block P or Q neighboring the boundary includes a transform coefficient?

(ii) Whether the block P or Q neighboring the boundary has a different reference picture or a motion vector difference value of a specific value(for example, 4) or more?

If any one of the following conditions is satisfied, BS may be determined to be 1 (S1450). If any one of the conditions is not satisfied, BS may be determined to be 0 (S1460).

In another embodiment of the present invention, if OBMC is performed using a neighbor PU, the BS determination unit 313 may additionally determine the edge 10 to be the PU boundary if the neighbor PU adjacent as in FIG. 13 has a boundary.

In this case, the aforementioned BS value determination process may be applied.

Furthermore, in the case of the edge 10, a BS value for the edge 10 may be determined by taking into consideration whether neighbor PUs include a transform coefficient or whether the neighbor PUs have a different reference picture or a motion vector difference value of a specific value(for example, 4) or more.

FIG. 15 is a flowchart illustrating a method of boundary strength (BS) based on coding information of a neighbor PU if OMBC is used as an embodiment to which the present invention is applied.

The present invention provides a method of determining boundary strength (BS) based on coding information of a neighbor PU if OMBC is used.

If a PU boundary or TU boundary is checked (S1510), BS may be determined based on information of neighbor blocks of a corresponding boundary. In this case, if OBMC is performed using a neighbor PU, whether adjacent neighbor PUs are PUs having a boundary may be checked. If the adjacent neighbor PUs are PUs having a boundary, a PU boundary may be additionally determined. In this case, the present invention provide a method of determining a BS value for the additionally determined PU boundary.

First, whether the block P or Q neighboring the boundary has been intra-coded may be checked (S1520).

If, as a result of the check, an intra-coded block of the blocks P or Q neighboring the boundary is present, BS may be determined to be 2 (S1530).

If an intra-coded block of the blocks P or Q neighboring the boundary is not present, whether any one of the following conditions is satisfied may be checked (S1540).

(i) Whether the block P or Q neighboring the boundary includes a transform coefficient?

(ii) Whether the block P or Q neighboring the boundary has a different reference picture (diff ref) or a motion vector difference value (diff mv) of 4 or more?

(iii) Whether neighbor PUs P' or Q' includes a transform coefficient?

(iv) Whether neighbor PUs P' or Q' has a different reference picture (diff ref) or a motion vector difference value (diff mv) of a specific value(for example, 4) or more?

If any one of the following conditions is satisfied, a BS value for the additionally determined PU boundary may be determined to be 1 (S1550). If any one of the conditions is not satisfied, a BS value may be determined to be 0 (S1560).

For example, in FIG. 13, in the case of the edge 10, a BS value for the edge 10 may be determined by taking into consideration whether the neighbor PUs P' or Q' include a transform coefficient or whether the neighbor PUs P' or Q' have a different reference picture or a motion vector difference value of a specific value(for example, 4) or more.

As described above, the embodiments explained in the present invention may be implemented and performed on a processor, a micro-processor, a controller or a chip. For example, functional modules explained in FIG. 1 to FIG. 3 and FIG. 11 may be implemented and performed on a computer, a processor, a microprocessor, a controller or a chip.

As described above, the decoder and the encoder to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional 3D video apparatus, a teleconference video apparatus, and a medical video apparatus and may be used to code video signals and data signals Furthermore, the decoding/encoding method to which the present disclosure is applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves, e.g., transmission through the Internet. Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method of performing deblocking filtering, comprising:
   decoding using an overlapped block motion compensation (OBMC) by using a motion vector of a surrounding block in addition to a motion vector of a current block and an overlapping window for an overlapped region;
   checking a transform unit (TU) boundary and a prediction unit (PU) boundary within the current block,
   wherein the TU boundary is determined based on a split transform flag indicating whether a TU has been split;
   determining a neighbor PU boundary between a first neighbor PU and a second neighbor PU that are surrounding blocks of the current block;
   determining an additional PU boundary which is extended from the neighbor PU boundary;
   determining a boundary strength (BS) for each of the TU boundary, the PU boundary and the additional PU boundary,
   wherein the BS for each of the TU boundary, the PU boundary and the additional PU boundary is determined based on at least one of whether an intra coding is performed or not, whether a transform coefficient exists or not, whether reference pictures are identical or not, and a size of a motion vector difference value; and
   performing a filtering on at least one of the TU boundary, the PU boundary, or the additional PU boundary based on the determined BS by considering an overlapped OBMC region,
   wherein a first motion vector of the first neighbor PU and a second motion vector of the second neighbor PU are different from each other, and
   wherein the BS for the additional PU boundary is further determined based on a difference between the first motion vector and the second motion vector.

2. The method of claim 1, wherein the filtering comprises performing a filtering on a horizontal edge boundary in a vertical direction after performing a filtering on a vertical edge boundary in a horizontal direction.

3. An apparatus for performing deblocking filtering, comprising:
   a processor configured to:
   decode using an overlapped block motion compensation (OBMC) by using a motion vector of a surrounding block in addition to a motion vector of a current block and an overlapping window for an overlapped region;
   check a transform unit (TU) boundary and a prediction unit (PU) boundary within the current block,
   wherein the TU boundary is determined based on a split transform flag indicating whether a TU has been split;
   determine a neighbor PU boundary between a first neighbor PU and a second neighbor PU that are surrounding blocks of the current block;
   determine an additional PU boundary extended from the neighbor PU boundary into an inner space of the current block;

determine a boundary strength (BS) for each of the TU boundary, the PU boundary and the additional PU boundary, wherein the BS for each of the TU boundary, the PU boundary and the additional PU boundary is determined based on at least one of whether an intra coding is performed or not, whether a transform coefficient exists or not, whether reference pictures are identical or not, and a size of a motion vector difference value;

perform a filtering on at least one of the TU boundary, the PU boundary, or the additional PU boundary based on the determined BS by considering an overlapped OBMC region, wherein a first motion vector of the first neighbor PU and a second motion vector of the second neighbor PU are different from each other, and wherein the BS for the additional PU boundary is further determined based on a difference between the first motion vector and the second motion vector.

4. The apparatus of claim 3, wherein the filtering comprises performing filtering on a horizontal edge boundary in a vertical direction after performing filtering on a vertical edge boundary in a horizontal direction.

* * * * *